3,155,567
SILICEOUS FIBER MATS AND METHOD OF MAKING SAME

Claude F. Harr, Toledo, Ohio, assignor to Johns-Manville Corporation, New York, N.Y., a corporation of New York
No Drawing. Filed Nov. 9, 1962, Ser. No. 236,703
8 Claims. (Cl. 161—170)

This invention relates to the production of new glass fiber mats and to the resulting product. More particularly this invention relates to glass fiber mat products possessed of a high resistance to moisture pickup, vibration and settling, and especially adaptable for use as insulation in the transportation industry. The fiber glass products have application under temperature conditions ranging from sub-zero to 350° F.

Originally, railway insulations were designed for iced cars. These insulations had, in addition to the problems of any cold insulation, certain unique working difficulties, the most serious of which were the extreme vibration from over-the-road travel and the repeated changes in exposure resulting from moving the car from one climatic or weather condition to another.

The advent of glass fiber insulation seemed to have satisfied the new need. One particularly successful product involved the use of "B" fibers, i.e., those having a diameter of .00010–.00015 in., combined in mat form in densities up to 3 lb./cu. ft. For the most part, this product had been able to pass the tests set forth by the various railway and trucking firms for prescribing workable insulations.

However, with the more recent entry of mechanical refrigerated cars, new and more rigorous working conditions and consequently test procedures developed, the satisfaction of which has proven to be a difficult task. As a consequence, certain of the heretofore acceptable insulations were no longer found to be qualified, creating the need for new and/or improved insulations.

However, the problems imposed by these new conditions appeared to be solved by the use of certain binder formulations. The various chemical systems that had been employed as binders for use with glass fibers in the manufacture of such thermal insulation products may be divided between systems formed chiefly of organic components and systems formed primarily of inorganic materials with the choice being dependent on the actual end use. Of the organic materials used, the silicone resins have been the most prominent.

Nevertheless, even with the development of new binders, the achievement of certain physical properties prescribed by the railroad companies remained a problem. Particularly, the silicone resin-mats failed to produce the desired water-repellent properties.

Accordingly, a treatment has been sought by the industry which would not only produce a product to satisfy the newly imposed qualifications, but which would also permit production of a glass fiber insulation in a minimum amount of time. Of course, the treatment would have to be such as not to affect adversely the improvements already achieved through binder formations.

It has been discovered that an insulation which has satisfactory wet strength, dimensional stability and both wet and dry resiliency in accordance with the prescribed requirements could be achieved by a specific glass fiber mat treatment.

Particularly, the method involves (1) treating the mat with a phenol formaldehyde resin binder modified with a silicone additive and curing the resin, and then (2) impregnating the mat with a silicone polymer catalyzed with an amino functional silane or a metallic octoate.

In the after-treatment both the silicone polymer and catalyst are in aerosol form, and are pre-mixed before application under controlled conditions.

Regarding the after-treatment, it was found by utilizing a controlled aerosol particle size, complete impregnation of the mat and proper coating of the fibers are achieved.

The product produced in this manner has the desired water repellent characteristics.

OBJECTS

It was therefore a principal object of this invention to provide a new glass fiber insulation which could satisfy the new requirements for certain insulating situations while retaining the good qualities heretofore possessed.

It was a further object of this invention to provide a new method of preparing such an insulation.

It was an additional object of this invention to provide a glass fiber refrigeration insulation which would meet the above-described criteria and particularly good water repellency, while remaining economically competitive with other types of insulations.

Another object of this invention was the provision of a new method of treating glass fiber mats to produce insulation satisfying the above-mentioned requirements.

Other objects and further scope of applicability of the present invention will become apparent from the detailed description given hereinafter.

BRIEF DESCRIPTION OF THE INVENTION

It has been discovered that the foregoing objects may be satisfied by producing glass fiber mats with a new coating or impregnating method. In the process, a glass fiber mat which may be prepared by any of the conventional techniques, is impregnated with a phenol formaldehyde resin binder, such as Monsanto 551, modified with a silicone polymer. Curing the resin produces an insulation having satisfactory wet strength, resiliency, both wet and dry, and dimensional stability. The required moisture repellency is achieved through an after-treatment with an aerosol effected by precombining two individual aerosol streams, one stream being a silicone polymer and the second a catalyst for the polymer and selected from the group consisting of amino functional silanes and metallic octoates. By employing this particular technique the need for curing resin at an elevated temperature and mixing the resin and catalyst before producing an aerosol is eliminated and the installation of the equipment required for applying after-treatment on the mat is simplified.

The after-treatment is accomplished by generating separate aerosols from both the resin and catalyst, mixing the two aerosols by introducing them into a manifold and subsequently transporting the combination into an air stream which carries the aerosol mixture to a plenum chamber. The material being treated is located in the plenum chamber so that the air stream carrying the aerosol mixture of resin and catalyst passes through the material whereby the catalyzed resin is deposited on the fibers of the mat.

Due to the possible filtering action of the insulation, an aerosol type of application with controlled particle size in the order of from ½ to 10 microns is necessary to accomplish complete penetration and proper deposition of the compositions within the insulation material involved.

GENERAL DESCRIPTION OF THE INVENTION

A more complete understanding of the invention may be obtained by reference to the following examples of operations within the scope of this invention. In these examples all parts and percentages are by weight unless otherwise indicated.

Examples I–III

Glass fiber mats of a one pound density were produced with 20% phenol formaldehyde binder modified with 0.2% of an amino functional silane based on the weight of the resin solids. The mats were oven cured and upon removal from the oven subjected to an aerosol mist. The mist consisted of a dimethyl silicone fluid polymer catalyzed with an amino functional silane and had a particle size on the order of ½ to 10 microns. The amounts of polymer and silane catalyst were varied using 0.2% polymer–0.7% silane, 0.3% polymer–0.1% silane and 0.1% polymer–0.3% silane, respectively for the three samples. The mist was produced through an Alemite Oil Mist Lubricator. The treated product was then cured.

From the mats were cut 10" x 30" samples. These were immersed in tap water in a 55-gallon steel drum, the drum covered and the contents subjected to a 20-inch vacuum. The vacuum was released after a few minutes and repeated until all air was removed from samples. The samples were permitted to remain in the drum so submerged for several hours, typically from two to eight.

Thereafter the samples were removed and drained, sometimes by standing on edge and sometimes by suspension from one end, and then placed in a second 55-gallon steel drum, which was covered. Steam was introduced through a ¼-inch copper tube at a temperature about 130 to 180° F. Samples remained in this atmosphere overnight. They were removed and returned to the first drum. This cycle was repeated for seven days.

In some instances during this seven-day period, 4" wide samples were cut from the ends of the 30-inch samples. Tensile strength data was taken while wet, and the mats rated 1, 2, 3 and 4, based on this evaluation. This data appears below in Tables 1 and 2. The mats proved to satisfy the new testing requirements.

TABLE 1.—WATER RETENTION 1 LB. DENSITY GLASS FIBER MATS AFTER CYCLING THROUGH—IMMERSION AND STEAMING—MODIFIED WITH SILICON

| Example | Orig. dry wt., gm. | Dry wt., gm. | Time in steam, hrs. | Drain time, min. | Wet wt. after steam cycle | Percent water by vol. | Time immer. water, hrs. | Drain time, min. | Wet wt., gm. | Percent water by vol. | Appearance rating | Wettability rating | Density, p.c.f. @ 3" |
|---|---|---|---|---|---|---|---|---|---|---|---|---|---|
| 1 | 239.6 | | 17½ | 15 | 425.2 | 1.3 | 4½ | 60 | 1,551 | 8.9 | 2 | 2 | 1.01 |
| 2 | 270.8 | | 17½ | 15 | 470.2 | 1.4 | 4½ | 60 | 1,604 | 9.1 | 1 | 1 | 1.15 |
| 3 | 254.8 | | 17½ | 15 | 497.3 | 1.6 | 4½ | 60 | 1,425 | 8.0 | 3 | 3 | 1.08 |
| Second cycle: | | | | | | | | | | | | | |
| 1 | 239.6 | | 18 | 15 | 1,126.2 | 6.0 | 4½ | 60 | 1,672 | 9.7 | 2 | 2 | |
| 2 | 270.8 | | 18 | 15 | 1,055.3 | 5.3 | 4½ | 60 | 1,631 | 9.2 | 1 | 1 | |
| 3 | 254.8 | | 18 | 15 | 1,343.0 | 7.4 | 4½ | 60 | 1,435 | 8.0 | 3 | 3 | |
| Third Cycle: | | | | | | | | | | | | | |
| 1 | 239.6 | (207.7) | 18 | 15 | 1,452.0 | 8.2 | 5¼ | 60 | 1,434.5 | 9.6 | 2 | 3 | |
| 2 | 270.8 | (234.7) | 18 | 15 | 1,414.0 | 7.8 | 5¼ | 60 | 1,415.0 | 9.3 | 1 | 1 | |
| 3 | 254.8 | (220.8) | 18 | 15 | 1,029.0 | 5.3 | 5¼ | 60 | 1,313.0 | 8.6 | 3 | 2 | |

TABLE 2.—WATER RETENTION 1-LB. DENSITY AFTER IMMERSION ONLY—MODIFIED WITH SILICONES

[Samples 3¼ x 6 x 12" drained from end by vertical suspension]

| Example | Dry Wt., gm. | Drain Time | Wet Wt., gm. | Percent Moisture by weight | Percent Moisture by volume |
|---|---|---|---|---|---|
| 1 | 60.0 | 15 secs | 1,643.5 | 2,639.2 | 41.4 |
| | | 24 hrs | 884.4 | 1,374.0 | 21.6 |
| | | 48 hrs | | | |
| | | 72 hrs | 515.5 | 759.2 | 11.9 |
| 2 | 59.8 | 15 secs | 1,449.3 | 2,323.6 | 36.3 |
| | | 24 hrs | 791.8 | 1,224.1 | 19.1 |
| | | 48 hrs | | | |
| | | 72 hrs | 426.4 | 613.0 | 9.6 |
| 3 | 57.6 | 15 secs | 1,524.3 | 2,546.4 | 38.4 |
| | | 24 hrs | 844.8 | 1,366.7 | 20.6 |
| | | 48 hrs | | | |
| | | 72 hrs | 493.7 | 757.1 | 11.4 |

Due to the unique method of installing this insulation, so that its weight and the weight of any moisture it may contain are carried in the cross-machine direction as the insulation is made, tensile tests on wet material in the cross-machine direction were also made and the results appear below in Table 3.

TABLE 3.—TENSILE STRENGTH WIDTHWISE 1-LB. DENSITY

| Sample | Tensile Lb. per Inch of Width (3-inch thick samples) | | |
|---|---|---|---|
| | Tested Dry | Tested Wet | After |
| 1 | 10.6 | 8.9 | 2½ cycles. |
| 2 | 13.0 | 4.5 | Do. |
| 3 | 15.6 | 8.3 | Do. |
| 4 | 22.5 | 21.9 | 5½ cycles. |

As the basic requirement was to produce a treatment which would provide water repellent properties equal to or better than competitive materials, provision for making comparisons of the amount of saturation in a given time was set up. The equipment consisted of oil drums 50% filled with tap water. Samples were placed with one face in contact with the water and observed. At regular intervals the degree of saturation was noted. The preparation of the samples and results of the test are set out in the following examples and Table 4 below.

Example IV

A glass fiber mat was prepared in accordance with standard methods using gas attenuation of continuous strands and deposition on a foraminous base, having a density of 1 lb./cu. ft. The sample was to function as a control sample so the mat contained only the phenol formaldehyde in about 20% by weight. As in Examples V and VI no after treatment was employed.

Example V

A second mat was prepared in the same manner as in Example IV using the phenol formaldehyde with 0.2% silicone oil added.

Example VI

A glass fiber mat was prepared in the same manner replacing the silicone oil with the amino functioning silicone used in Example I–III.

Example VII

A glass fiber mat was made in accordance with the method of Example IV and after treated with 0.5% of an uncatalyzed silicone polymer aerosol mist.

Example VIII

Example VII was repeated using an 0.2% amino functional silane catalyzed silicone polymer aerosol mist after treatment.

Example IX

A glass fiber mat was made in accordance with the method of Examples I–III using both silane modified phenol formaldehyde binder and silane catalyzed polymer after treatment.

Example X

Example IX was repeated substituting zinc octoate as the catalyst in the after treatment.

Example XI

Example IX was repeated using a cure of 160° F. for the after treatment.

From the data appearing below in Table 4, it is seen that the most satisfactory results are obtained when the thermosetting phenol formaldehyde resin binder is modified with the amino functioning silane followed by the aerosol after-treatment as discussed above. This is represented by Examples VIII–XI wherein the silicon aerosol was catalyzed with amino functioning silanes as well as metallic octoates. It is also demonstrated that improvements can be made over conventional mats by modifying the phenol formaldehyde binder with the amino silane as shown in Example VI. However, it is recommended for the best results, that the thermosetting resin binder be modified and the aerosol after-treatment employed.

ft. and an aerosol velocity of 500 cu. ft./min., duration of treatment may range from 30 seconds to 2 minutes or longer. It is preferred that the temperature of the air stream carrying the aerosol be controlled on the order of 160–200° F. to accelerate the cure of the silicone polymer.

The instant glass fiber mats regain most of their original thickness immediately after water runs off. They retain most of their resiliency after exposure both to immersion in water and to vapor from low pressure steam. In typical steam and immersion tests, they retain, on draining and on drying, most of their original thickness. In most cases, it is difficult to tell a sample that has been immersed and dried from one that has not been immersed.

Tested in accordance with Commercial Standard CS131–46, exposed to 95% relative humidity at 120° F.

TABLE 4.—SUMMARY OF WATER ABSORPTION TESTS

| Example | Treatment Time | Curing data | Rate of Saturation, Percent of Volume Submerged or Saturated in— | | | | | | | Other as noted |
|---|---|---|---|---|---|---|---|---|---|---|
| | | | Percent, 1 hr. or less | 2 hrs. | 5 hrs. | 12 hrs. | 24 hrs. | 72 hrs. | 1 week | |
| 4 | | | 100 | | | | | | | |
| 5 | | | 100 | | | | | | | |
| 6 | | | | 75 | 100 | | | | | |
| 7 | 1 min., 1 side | 35 mins., 225° F | | | | | | 33 | 40 | |
| 8 | 2 mins., 2 sides | None | | | | | 4 | | | 14 days, 8%. |
| 9 | 3 mins., 1 side | 10 mins., 250° F | | | | | | | | 24 days, 12%. |
| 10 | 1 min., 2 sides | None | | | | | | | 12 | |
| 11 | 2 mins., 1 side | 160° air | | | | | | 12 | | 28 days, 12%. |

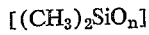

As example of the amino functional silane is Dow Corning Z–6020 which contains primary and secondary amine groups. It is a brown liquid with a viscosity at 25° C. of 5.15 centistokes and a specific gravity at 25° C. of 1.03 to 1.06. It has a refractive index at 25° C. of 1.45 and a neutralization equivalent of 123. Also useful are the methyl substituted amino silanes.

As mentioned above, metallic octoates may also be used as the catalyst for the silicone polymer. Such octoates include stannous octoate, zinc octoate and iron octoate. These materials are generally used in equal volume with the silicone polymer.

An example of the silicone polymer is Dow Corning 1107 which is a colorless, odorless, nontoxic fluid. Chemically it is similar to dimethyl silicone fluid $$[(CH_3)_2SiO_n]$$

except that many of the methyl groups have been replaced by hydrogen atoms. On heat curing, the polymers cross-link at the sites of hydrogen atoms to form a resinous release coating. It is water white liquid with a specific gravity at 25° C. of 0.995 to 1.015, a viscosity at 25° C. of 20 to 40 centistokes, a minimum flash point of 200° F. and a maximum acid number of 0.02.

The amount of the various materials used in the glass fiber mat may be varied but it is preferred to use between about 15 and 25% phenol formaldehyde binder based on the weight of the mat with about 20% being preferred, between about 0.1 and 2.5% silane additive for the binder based on the total resin-solid content with between 0.1 and 1.0% being preferred; between 0.1 and 5% silicone polymer based on the weight of mat for the after-treatment with between 0.1 and 2% being preferred; and between 0.1 and 5% catalyst for the polymer based on the weight of the mat with between 0.1 and 2% being preferred.

The method of after-treating the glass fiber mats, for the most part, has been set forth in Examples I–III. After the glass fiber binder combination is oven cured, the mat passes through a plenum chamber wherein the aerosol mists of about ½ to 10 microns in size are preferably directed against both major faces of the mat. The extent of the treatment is dependent on the velocity of the aerosol stream, speed of the mat through the chamber and density of mat. For densities of about 1 lb./cu.

for 96 hours, the mat picked up 3.2% moisture by weight, or approximately 0.02% moisture by volume.

Capacity to drain rapidly, to retain its tensile in the cross-machine direction after severe exposure, and to maintain its thickness after severe exposure gives the instant product the characteristics needed to maintain its position as installed in typical railway car construction.

While the instant invention has demonstrated particular advantages for glass fiber mats bonded by phenol formaldehyde resin, it is contemplated that beneficial results may also be gained with other resin-fiber combinations such as asbestos and silica fibers and polyester and epoxy resin systems.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:
1. A method of producing water repellent glass fiber mats characterized by good insulating properties comprising;
 (a) forming a glass fiber mat of randomly arranged fibers having a density up to about 3 lbs./cu. ft. and containing about 15 to 25% by weight of a thermosetting resin binder distributed therein, said thermosetting resin binder being modified by a silicone resin in an amount between about 0.1 and 2.5% by weight of said thermosetting resin,
 (b) applying heat and pressure to said mat to cure said resin and impart a final shape to said mat, and
 (c) treating said mat with an aerosol of a silicone polymer in the amount between about 0.1 and 5.0% by weight of said mat and a catalyst in amount between about 0.5 and 5.0% by weight of said mat selected from a group consisting of amino functional silanes and metallic octoates, said aerosol particles having an average size between about ½ and 10 microns.

2. A method as defined in claim 1 wherein the aerosol is applied by combining separate aerosol streams of the silicone polymer and catalyst in a chamber through which the cured glass fiber mat passes.

3. A method as defined in claim 2 wherein the catalyst is zinc octoate.

4. A method as defined in claim 2 wherein the catalyst is iron octoate.

5. A method as defined in claim 2 wherein the catalyst is stannous octoate.

6. A method as defined in claim 1 wherein the aerosol is applied to the glass fiber mat at a temperature between about 160 and 200° F.

7. A method as defined in claim 1 wherein both the silicone polymer and catalyst are present in the amount between about 0.1 and 2.0% by weight of said mat.

8. A glass fiber mat, characterized by good water repellent and insulating properties, having a density up to about 3 lbs./cu. ft. comprised of a mass of individual discontinuous fibers bonded together at their intersections with between 15 and 25% by weight of said mat of a cured thermosetting resin modified by a silicone resin in an amount between 0.1 and 2.5% by weight of said thermosetting resin, said mat having aerosol particles uniformly dispersed throughout of a silicone polymer catalyzed by a compound selected from the group consisting of amino silanes and metallic octoates, and further characterized by the silicone polymer and catalyst each being present in the amount between about 0.1 and 5.0% by weight of said mat, said aerosol particles having an average size between about ½ and 10 microns.

References Cited in the file of this patent
UNITED STATES PATENTS

| | | |
|---|---|---|
| 2,409,951 | Nootens | Oct. 22, 1946 |
| 2,477,555 | Roberts et al. | July 26, 1949 |
| 2,561,362 | Guillot | July 24, 1951 |
| 2,577,205 | Meyer et al. | Dec. 4, 1951 |
| 2,660,736 | Biefeld | Dec. 1, 1953 |
| 2,718,483 | Clark | Sept. 20, 1955 |
| 2,970,122 | McLoughlin | Jan. 31, 1961 |
| 3,052,583 | Carlstrom et al. | Sept. 4, 1962 |

UNITED STATES PATENT OFFICE
CERTIFICATE OF CORRECTION

Patent No. 3,155,567                                         November 3, 1964

Claude F. Harr

It is hereby certified that error appears in the above numbered patent requiring correction and that the said Letters Patent should read as corrected below.

Column 3, line 54, for "Samples 314" read -- Samples 3-1/4 --; column 5, line 33, for "As" read -- An --.

Signed and sealed this 10th day of August 1965.

(SEAL)
Attest:

ERNEST W. SWIDER                                    EDWARD J. BRENNER
Attesting Officer                                        Commissioner of Patents